(12) United States Patent  
Iwasaki et al.

(10) Patent No.: US 9,951,740 B2
(45) Date of Patent: Apr. 24, 2018

(54) INTERNAL COMBUSTION ENGINE

(71) Applicant: NGK INSULATORS, LTD., Nagoya (JP)

(72) Inventors: Shingo Iwasaki, Nagoya (JP);
Masahiro Kida, Nagoya (JP);
Yoshihiro Yamamoto, Nagoya (JP);
Tomonori Urushihara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 113 days.

(21) Appl. No.: 15/053,299

(22) Filed: Feb. 25, 2016

(65) Prior Publication Data

US 2016/0169185 A1  Jun. 16, 2016

Related U.S. Application Data

(63) Continuation of application No. PCT/JP2014/072263, filed on Aug. 26, 2014.

(30) Foreign Application Priority Data

Aug. 26, 2013 (WO) .................. PCT/JP2013/072753

(51) Int. Cl.
*F02F 3/04* (2006.01)
*F02B 23/06* (2006.01)
(Continued)

(52) U.S. Cl.
CPC .............. *F02P 5/04* (2013.01); *F02B 23/06* (2013.01); *F02B 23/0672* (2013.01);
(Continued)

(58) Field of Classification Search
CPC ... F02F 3/045; F02F 3/12; F02F 3/285; F02B 23/0603; F02B 23/0612; F02B 23/0672
(Continued)

(56) References Cited

U.S. PATENT DOCUMENTS 4,018,194 A * 4/1977 Mitchell ............. F02B 23/0603
123/193.6
4,711,208 A * 12/1987 Sander ................ F02B 23/0603
123/271
(Continued)

FOREIGN PATENT DOCUMENTS

EP  0 911 500 A2  4/1999
JP  56-143328 A  11/1981
(Continued)

OTHER PUBLICATIONS

Extended European Search Report (Application No. 14839018.0) dated Apr. 18, 2017.
(Continued)

*Primary Examiner* — Erick Solis
(74) *Attorney, Agent, or Firm* — Burr & Brown, PLLC

(57) ABSTRACT

An internal combustion engine includes a combustion chamber, a fuel injector injecting fuel into the combustion chamber, a cylinder, a piston having a crown and reciprocating in the cylinder, the crown being exposed to the combustion chamber, and an ignition delay enhancer prolonging an ignition delay of a fuel-air mixture in the combustion chamber. A ceramic member is disposed on at least a fuel injection port, to which fuel is injected from the fuel injector, of the crown of the piston.

15 Claims, 6 Drawing Sheets

(51) Int. Cl.
- *F02P 5/04* (2006.01)
- *F02F 3/28* (2006.01)
- *F02F 3/14* (2006.01)
- *F02F 3/26* (2006.01)
- *F02F 3/00* (2006.01)
- *F02M 26/52* (2016.01)
- *F02M 26/05* (2016.01)
- *F02M 26/07* (2016.01)
- *F02M 26/34* (2016.01)
- *F02M 26/44* (2016.01)

(52) U.S. Cl.
CPC .......... *F02F 3/0015* (2013.01); *F02F 3/0084* (2013.01); *F02F 3/045* (2013.01); *F02F 3/14* (2013.01); *F02F 3/26* (2013.01); *F02F 3/285* (2013.01); *F02M 26/52* (2016.02); *F02B 2023/0612* (2013.01); *F02M 26/05* (2016.02); *F02M 26/07* (2016.02); *F02M 26/34* (2016.02); *F02M 26/44* (2016.02); *F05C 2203/08* (2013.01); *F05C 2203/0843* (2013.01); *F05C 2203/0869* (2013.01); *F05C 2203/0886* (2013.01); *F05C 2203/0895* (2013.01); *Y02T 10/125* (2013.01)

(58) Field of Classification Search
USPC ......... 123/193.4, 193.6, 270, 271, 279, 298, 123/305, 668, 669
See application file for complete search history.

(56) References Cited

U.S. PATENT DOCUMENTS

| | | | | |
|---|---|---|---|---|
| 4,774,926 A | * | 10/1988 | Adams | F02B 77/02 123/188.3 |
| 4,796,572 A | | 1/1989 | Heydrich | |
| 4,838,149 A | * | 6/1989 | Donnison | F02F 3/14 123/193.6 |
| 4,942,804 A | * | 7/1990 | Matsuura | F02F 3/14 123/193.6 |
| 4,953,528 A | * | 9/1990 | Oikawa | F02B 23/0603 123/271 |
| 5,273,009 A | * | 12/1993 | Ozawa | F02F 3/045 123/193.6 |
| 5,483,933 A | * | 1/1996 | Kawamura | F02B 23/0603 123/254 |
| 2010/0194513 A1 | | 8/2010 | Ozawa et al. | |
| 2010/0307450 A1 | | 12/2010 | Kashdan | |
| 2011/0159408 A1 | | 6/2011 | Kimura et al. | |
| 2012/0167858 A1 | | 7/2012 | Kakuda et al. | |
| 2012/0234285 A1 | * | 9/2012 | Venugopal | F02B 23/0651 123/193.6 |
| 2014/0216396 A1 | | 8/2014 | Yamashita et al. | |

FOREIGN PATENT DOCUMENTS

| | | |
|---|---|---|
| JP | U60-095135 A | 6/1985 |
| JP | 61-142320 A1 | 6/1986 |
| JP | 01-015861 Y2 | 5/1989 |
| JP | 01-121552 A | 5/1989 |
| JP | H01-170745 A | 7/1989 |
| JP | 01-208552 A | 8/1989 |
| JP | 01-227852 A | 9/1989 |
| JP | 01-244149 A | 9/1989 |
| JP | 01-300042 A | 12/1989 |
| JP | 01-318750 A | 12/1989 |
| JP | 03-179153 A | 8/1991 |
| JP | 04-097964 A | 3/1992 |
| JP | 04-054926 U | 5/1992 |
| JP | 04-191413 A | 7/1992 |
| JP | 04-272455 A | 9/1992 |
| JP | 05-163970 A | 6/1993 |
| JP | 11-190217 A | 7/1999 |
| JP | 2000-328973 A | 11/2000 |
| JP | 2002-206448 A | 7/2002 |
| JP | 2006-029292 A | 2/2006 |
| JP | 2010-192889 A | 9/2010 |
| JP | 2010-281322 A | 12/2010 |
| JP | 2011-046002 A | 3/2011 |
| JP | 2011-134537 A | 7/2011 |
| WO | 2013/035272 A1 | 3/2013 |

OTHER PUBLICATIONS

International Search Report and Written Opinion (with English Translation), International Application No. PCT/JP2014/072263, dated Dec. 2, 2014 (28 pages).

* cited by examiner

| Property | Aluminum Alloy (Casting Material) | Cast Iron (FC250, FCD450)[*1] | SiAlON | Silicon Nitride ($Si_3N_4$) |
|---|---|---|---|---|
| Density | 2.7g/cm³ | 7.1-7.3g/cm³ | 3.2g/cm³ | 3.2g/cm³ |
| Strength[*2] | approx. 50-300MPa | 250MPa (FC250) 450MPa (FCD450) | approx. 700-1200MPa | approx. 600-1000MPa |
| Young's Modulus | 70-80GPa | 120GPa (FC250) 180GPa (FCD450) | 300GPa | 300GPa |
| Thermal Conductivity | approx. 100-200W/mK | approx. 50W/mK | approx. 10-30W/mK | approx. 10-100W/mK |
| Coefficient of Thermal Expansion | approx. 23ppm/K | approx. 12ppm/K | approx. 3ppm/K | approx. 3ppm/K |
| Hardness (Hv) | 30-100Hv | 200Hv | 1600Hv | 1400Hv |

| Property | Mullite | Alumina ($Al_2O_3$) | Yttria-Stabilized Zirconia ($ZrO_2$) |
|---|---|---|---|
| Density | 3.2g/cm³ | 3.6-3.9g/cm³ | 5.6-6.0g/cm³ |
| Strength[*2] | 280MPa | 400MPa | 1000MPa |
| Young's Modulus | 200-220GPa | 200-380GPa | 200-220GPa |
| Thermal Conductivity | approx. 5W/mK | approx. 10-30W/mK | approx. 3W/mK |
| Coefficient of Thermal Expansion | approx. 5ppm/K | approx. 7ppm/K | approx. 11ppm/K |
| Hardness (Hv) | 1100Hv | 1200-2100Hv | 1100-1300Hv |

(*1) FC250: Gray Cast Iron, FCD450: Spherical Cast Iron
(*2) Tensile Strength (Metals)
Bending Strength (Ceramics)

FIG. 8

INTERNAL COMBUSTION ENGINE

CROSS-REFERENCE TO RELATED APPLICATIONS

This application is a continuation application of PCT/JP2014/072263 filed on Aug. 26, 2014, which claims priority to PCT/JP2013/072753 filed on Aug. 26, 2013, the entire contents all of which are incorporated herein by reference.

BACKGROUND OF THE INVENTION

1. Field of the Invention

The present invention relates to an internal combustion engine to be mounted in a machine, such as a vehicle, for generating mechanical power through combustion of fuel in the internal combustion engine.

2. Description of the Related Art

To reduce exhaust gases, such as $CO_2$ and NOx, most of diesel vehicles are equipped with exhaust gas recirculation (EGR) systems for recirculating part of the exhaust gas from the internal combustion engines into intake air. The EGR system allows the vehicle to perform a low-temperature combustion by introducing a large amount of exhaust gas after combustion (EGR gas) into the combustion chamber to lower the combustion temperature. Such an EGR system is disclosed in JP-A-H05-163970, for example. To improve the intake efficiency of the internal combustion engines, most of the diesel vehicles are equipped with superchargers for supercharging intake air into the combustion chambers of the internal combustion engines. Such a supercharger is disclosed in JP-U-H04-054926, for example.

SUMMARY OF THE INVENTION

The following are comparisons between internal combustion engines mounted in gasoline vehicles (gasoline engines) and internal combustion engines mounted in diesel vehicles (diesel engines). The combustion pressure in gasoline engines is several MPa, while that in diesel engines is approximately 10 to 15 MPa and is expected to reach approximately 20 to 30 MPa in the future. The fuel injection pressure in gasoline engines is approximately 1 MPa (approximately 10 MPa in the case of direct injection), while that in diesel engines is approximately 200 MPa and is expected to reach approximately 250 to 300 MPa in the future. In gasoline engines, various coatings (ceramic coating by thermal spraying of $ZrO_2$, for example) have been applied to metal piston crowns for thermal insulation. In diesel engines, which have much higher combustion pressure and fuel injection pressure than gasoline engines, however, such coatings have confronted problems such as peeling of coating layers or erosion due to fuel injection. In addition, pistons made of aluminum alloy, on which ceramic coatings are to be applied, also have various problems such as strength poverty under high combustion pressure and fuel injection pressure as described in detail below.

In diesel vehicles, a low-temperature combustion for reducing exhaust gases, such as $CO_2$ and NOx, may cause the fuel, which is injected into the combustion chamber of the internal combustion engine to adhere to the piston crown, to be cooled to evaporate as unburned material. This causes bad emission and poor combustion efficiency. The piston crown is thus required to have thermal insulation for preventing generation of unburned material, thereby reducing emission and fuel consumption.

The piston made of aluminum alloy, of which the crown is exposed to the combustion chamber of the internal combustion engine, is lightweight, however, lacks strength under a high combustion pressure in the combustion chamber caused by supercharging intake air into the combustion chamber. Moreover, the aluminum alloy piston cannot maintain a high temperature of the wall of the piston crown in the internal combustion engine due to its high thermal conductivity. This may cause the fuel, which is injected into the combustion chamber to adhere to the piston crown, to be cooled to evaporate as unburned material.

The high thermal conductivity of aluminum alloy also may cause thermal loss and lower thermal efficiency. In addition, the low hardness of aluminum alloy may cause erosion due to fuel injection during a long time use.

The piston made of aluminum alloy may deform especially at a high temperature due to its low Young's modulus and thermal resistance. Accordingly, a high combustion pressure in the combustion chamber may cause the piston to deform. In addition, the lip, which is at an inner edge of an opening in the top surface of the piston crown, will have a high temperature and may be broken. For example, JP-A-H04-097964 and JP-A-H04-272455 describe the methods for protecting the lips of aluminum pistons against heat. The inventions in these patent documents disclose the improvements in the lips, but do not disclose the improvements in the heat resistance and heat insulation of the entire interiors of the combustion chambers.

To reduce exhaust gases, such as $CO_2$ and NOx, especially in heavy duty diesel vehicles, the internal combustion engines are required to be operated at a lower rotation speed under a higher load by using engine piston materials with higher wear resistance and mechanical strength. Specifically, cast iron or steel is used for the engine piston materials. Such engine piston materials, however, increase the weight of the piston and thus the weight of the internal combustion engine. A lightweight aluminum alloy, which is a candidate material, has the above described problem. That is, the high thermal conductivity of aluminum alloy may cause the fuel, which is injected into the combustion chamber to adhere to the piston crown, to be cooled to evaporate as unburned material.

An object of the present invention, which has been accomplished to solve the above problems, is to provide an internal combustion engine having a ceramic member on a crown of a piston for maintaining a high temperature of the wall of a fuel injection port, to which fuel is injected from the fuel injector, of the piston crown, thereby preventing the fuel injected into the combustion chamber from evaporating as unburned material and reducing the emission of the unburned material if a low-temperature combustion is performed by prolonging an ignition delay of a fuel-air mixture in the combustion chamber; preventing the deformation of the aluminum alloy due to a high combustion pressure; reducing the weight of the engine piston compared to an engine piston made of cast iron or steel; and overcoming a high combustion pressure in the combustion chamber with the large-strength piston crown.

The internal combustion engine of the present invention includes a combustion chamber, a fuel injector injecting fuel into the combustion chamber, a cylinder, a piston having a crown and reciprocating in the cylinder, the crown being exposed to the combustion chamber, and an ignition delay enhancer prolonging an ignition delay of a fuel-air mixture in the combustion chamber. A ceramic member is disposed on at least a fuel injection port, to which fuel is injected from the fuel injector, of the piston crown.

In the internal combustion engines prior to development of the EGR systems, a high-temperature combustion had been performed. In a high-temperature combustion, a local and temporal temperature in combustion a chamber ranges from 1500 K to 2500 K. As disclosed in JP-A-H01-121552, JP-A-H01-227852, JP-A-H01-244149, JP-A-H01-208552, JP-A-H01-300042, and JP-A-H03-179153, even in the old internal combustion engines, it had been contemplated to apply ceramic members to the entire areas of the combustion chambers for improving the thermal insulation of the internal combustion engines to reduce the thermal loss in the combustion chambers. Such thermally insulating engines can reduce the thermal loss in the combustion chambers, however, the ceramic members maintain high temperatures of the walls of the combustion chambers. This causes the rises in the temperatures in the combustion chambers, resulting in poor fuel-air mixing due to degradation in the fuel viscosity and poor intake efficiency. Applying the ceramic members to the entire areas of the combustion chambers then had many obstacles. The present invention focuses on a low-temperature combustion achieved by prolonging an ignition delay of a fuel-air mixture in the combustion chamber. In a low-temperature combustion, a local and temporal temperature in a combustion chamber ranges from 1300 K to 1800 K. The present invention aims to prevent the fuel, which is injected into the combustion chamber to adhere to the piston crown, from evaporating as unburned material in a low-temperature combustion. The object of the present invention and advantageous effects of the ceramic member are completely different from those of the traditional applications of the ceramic members to the entire areas of the combustion chambers in a high-temperature combustion at a local and temporal temperature in the range of 1500 K to 2500 K.

As disclosed in JP-A-S56-143328 and JP-A-H01-318750, in the old internal combustion engines performing a high-temperature combustion at a local and temporal temperature in the range of 1500 K to 2500 K, ceramic members were used for portions undergoing stress concentration, of coupling structures, resulting in their complicated structures and large usage. The large usage of the ceramic members also causes the problem of heat capacity. In the present invention, a minimum amount of the ceramic member is used on the piston crown to be exposed to a low-temperature combustion in the combustion chamber. This lowers the manufacturing costs.

In this manner, the ceramic member on the piston crown to be exposed to a low-temperature combustion in the combustion chamber in the present invention is completely different from the above technique for a high-temperature combustion at a local and temporal temperature in the range of 1500 K to 2500 K.

In the internal combustion engine of the present invention, the ceramic member may be combined with any other member constituting the piston.

In this case, the ceramic member may be combined with any metallic member constituting the piston.

The ceramic member may be combined with any other member constituting the piston by mechanical coupling, junction, shrink fitting, press fitting, or enveloped casting.

The ceramic member may be formed by die molding, cold isostatic pressing (CIP), extrusion molding, injection molding, slip casting, or gel casting.

The gel casting adopted in the present invention is disclosed in JP-A-2010-192889, JP-A-2011-046002, and JP-A-2011-134537, for example.

In the internal combustion engine of the present invention, the piston crown has a cavity defining part of the combustion chamber. Fuel is injected from the fuel injector to the cavity. The ceramic member may be disposed on at least a portion facing the cavity, of the piston crown.

In this case, the overhang ratio represented in the following expression may range from 0.57 to 0.96.

$$\text{Overhang Ratio} = d1/d2$$

where $d1$ is a diameter of the boundary between the ceramic member and any other member on the top surface of the piston crown and $d2$ is a maximum diameter of the boundary between the ceramic member and the other member in the radial direction of the piston.

In the internal combustion engine of the present invention, the ceramic member may be disposed over the entire area of the piston crown.

The internal combustion engine of another embodiment of the present invention includes a combustion chamber, a fuel injector injecting fuel into the combustion chamber, a cylinder, a piston having a crown and reciprocating in the cylinder, the crown being exposed to the combustion chamber, and an ignition delay enhancer prolonging an ignition delay of a fuel-air mixture in the combustion chamber. A ceramic member is disposed on the piston crown.

In the internal combustion engine of the present invention, a cylinder liner may be disposed on the inner surface of the cylinder, the cylinder liner facing the outer surface of the piston, and a ceramic member may be disposed on at least a part facing the piston crown, of the cylinder liner.

In this case, the ceramic member on the cylinder liner and the ceramic member on the piston crown may be composed of the same material.

Alternatively, the ceramic member on the cylinder liner and the ceramic member on the piston crown may be composed of different materials.

In this case, the ceramic member on the cylinder liner may be composed of a porous material having interconnected pores.

The ceramic member on the cylinder liner may be composed of silicon nitride, alumina, mullite, SiAlON, stabilized zirconia, silica, or a mixture containing at least one of these materials.

In the internal combustion engine of the present invention, the ceramic member on the piston crown may be composed of a material having a thermal conductivity of 30 W/mK or less.

In this case, the ceramic member on the piston crown may be composed of a material having a thermal conductivity of 20 W/mK or less.

In the internal combustion engine of the present invention, the ceramic member on the piston crown may be composed of silicon nitride, SiAlON, stabilized zirconia, or a mixture containing at least one of these materials.

In the internal combustion engine of the present invention, the ignition delay enhancer may perform exhaust gas recirculation (EGR) for recirculating part of exhaust gas after the combustion in the combustion chamber into intake air to prolong an ignition delay of a fuel-air mixture in the combustion chamber.

In this case, the ignition delay enhancer may keep an EGR rate of 15% or more in recirculation of exhaust gas.

The ignition delay enhancer may keep a compression ratio of 17 or less by controlling the piston reciprocation to prolong an ignition delay of a fuel-air mixture in the combustion chamber. The compression ratio is the ratio of the maximum volume to the minimum volume of the combustion chamber.

The ignition delay enhancer may advance or delay a fuel injection timing such that a main heat generation takes place after a main fuel injection in the combustion chamber to prolong an ignition delay of a fuel-air mixture in the combustion chamber.

A supercharger may be provided for supercharging intake air into the combustion chamber.

BRIEF DESCRIPTION OF THE DRAWINGS

FIG. 8 is a table including material properties of members such as cylinders and pistons in the internal combustion engines according to the embodiments of the present invention and in traditional internal combustion engines.

DETAILED DESCRIPTION OF THE INVENTION

Figure 1:
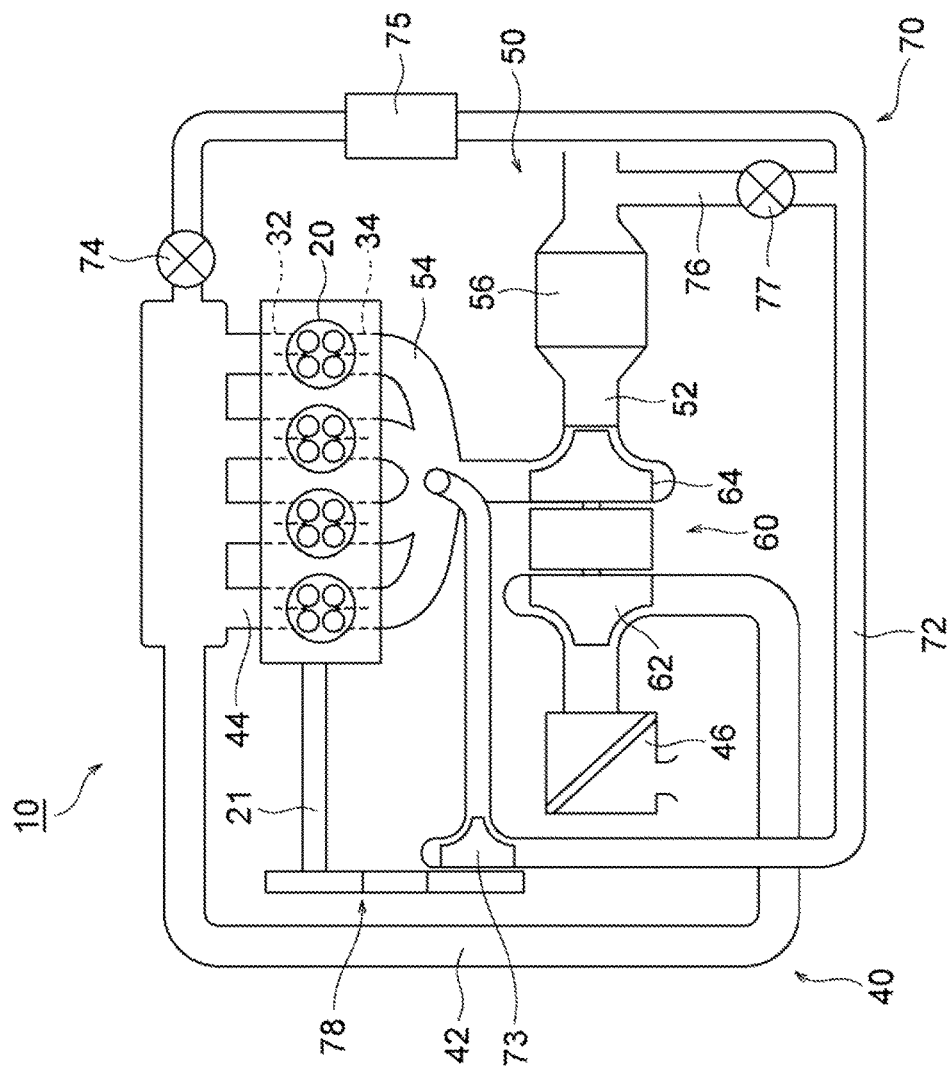
FIG. 1 is a schematic diagram illustrating an internal combustion system including the internal combustion engine according to an embodiment of the present invention.
Figure 2:
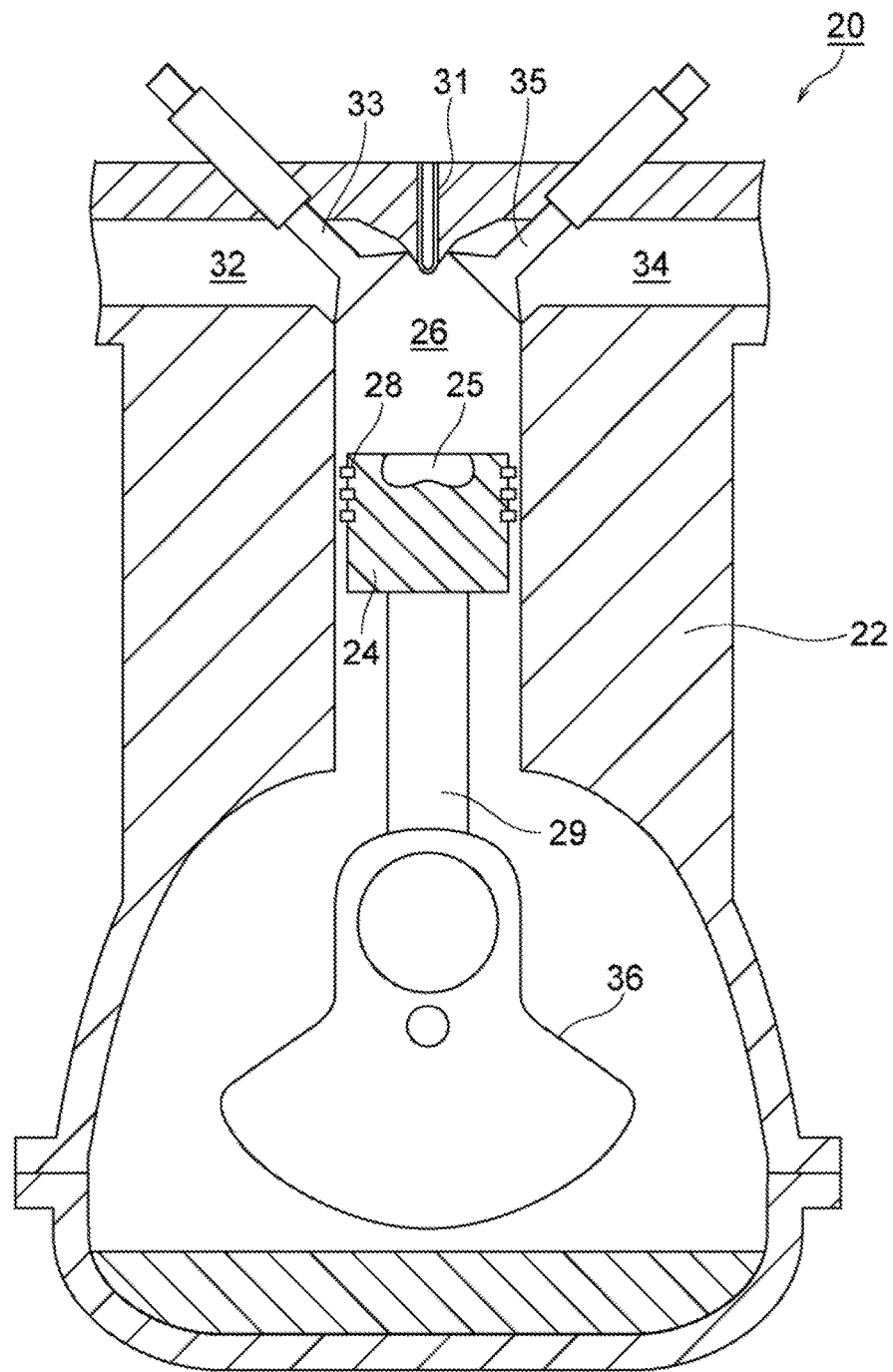
FIG. 2 is a vertical cross-sectional view illustrating the internal combustion engine according to an embodiment of the present invention.
Figure 3:
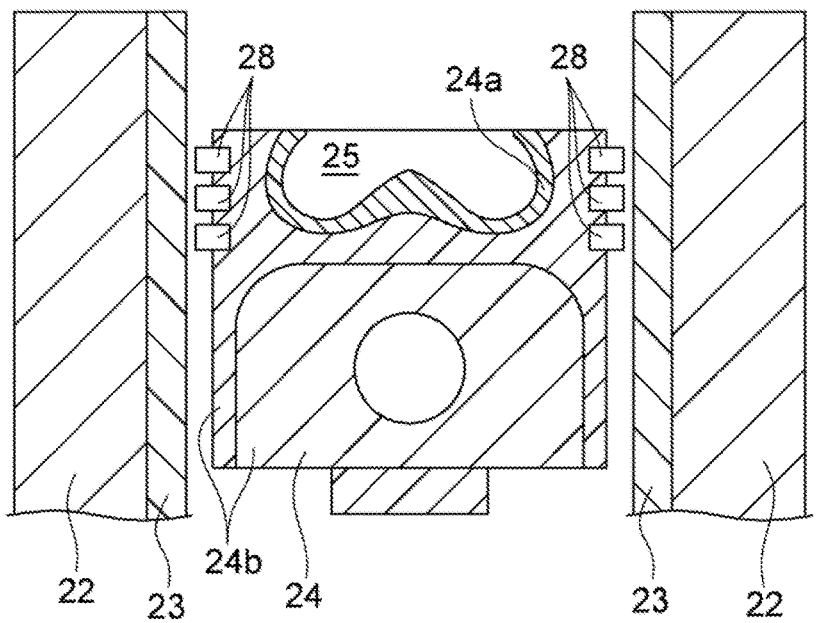
FIG. 3 is a vertical cross-sectional view illustrating an example arrangement of a cylinder and a piston in the internal combustion engine shown in FIG. 2.
Figure 4:
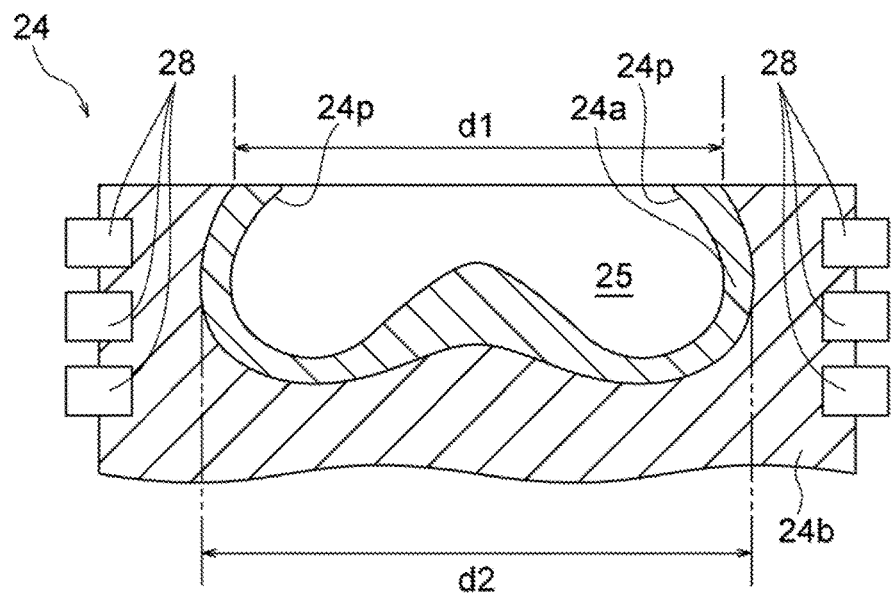
FIG. 4 is an enlarged vertical cross-sectional view illustrating an example crown of the piston shown in FIG. 3.
Figure 5:
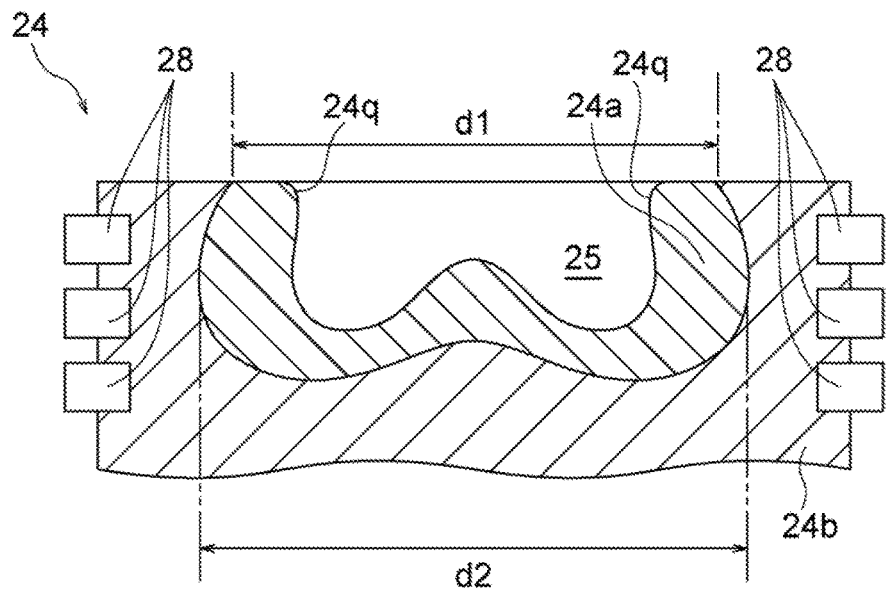
FIG. 5 is an enlarged vertical cross-sectional view illustrating another example crown of the piston shown in FIG. 3.
Figure 6:
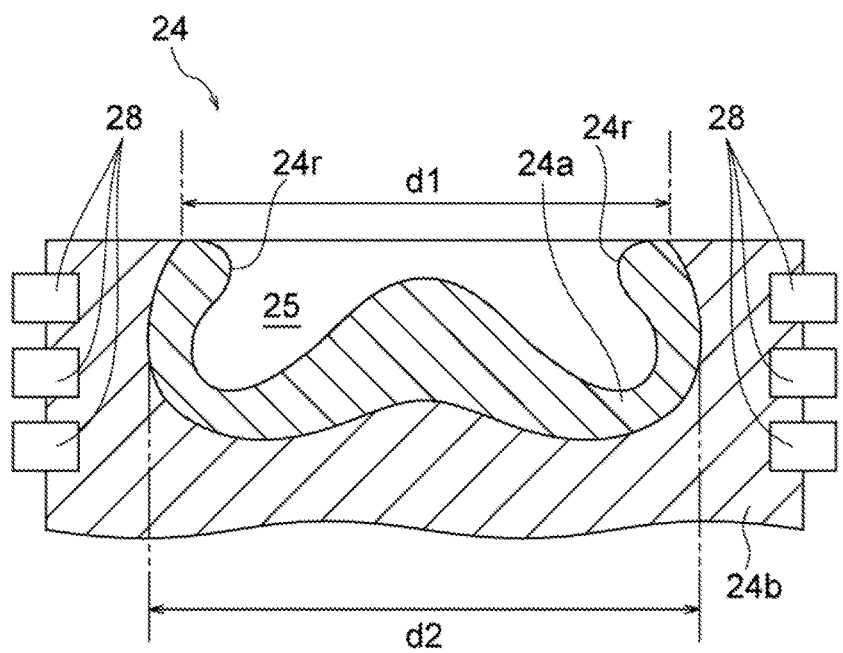
FIG. 6 is an enlarged vertical cross-sectional view illustrating yet another example crown of the piston shown in FIG. 3.
Figure 7:
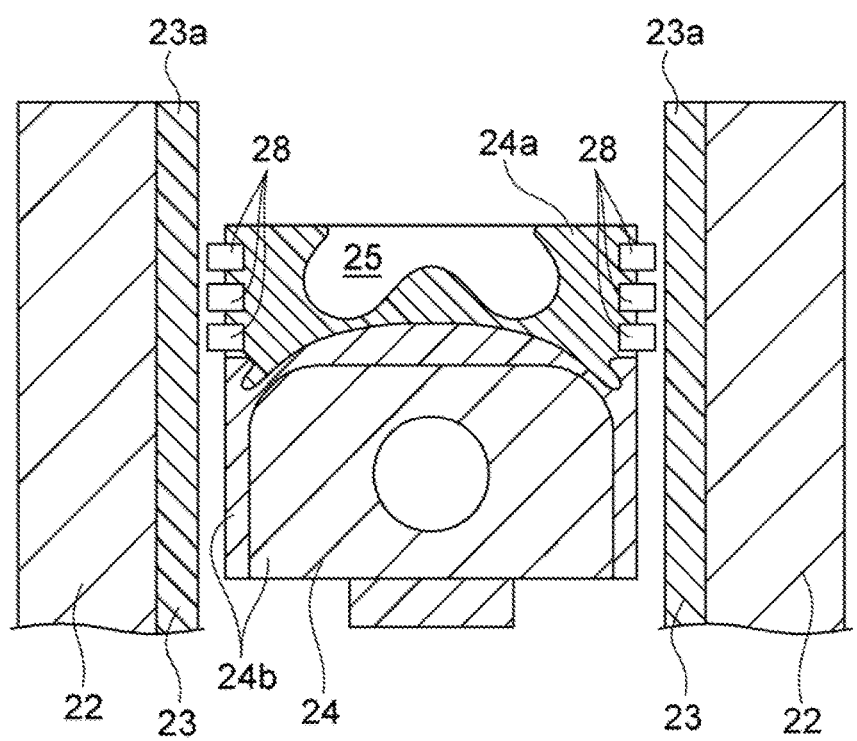
FIG. 7 is a vertical cross-sectional view illustrating another example arrangement of a cylinder and a piston in the internal combustion engine shown in FIG. 2.

Embodiments of the present invention will now be described with reference to the accompanying drawings. FIGS. 1 to 8 illustrate the internal combustion engines of the present embodiments or an internal combustion engine system including the internal combustion engine of an embodiment of the invention. FIG. 1 is a schematic diagram illustrating an internal combustion system including the internal combustion engine of the present embodiment. FIG. 2 is a vertical cross-sectional view illustrating the internal combustion engine of the present embodiment. FIG. 3 is a vertical cross-sectional view illustrating an example arrangement of a cylinder and a piston in the internal combustion engine shown in FIG. 2. FIGS. 4 to 6 are enlarged vertical cross-sectional views illustrating different example crowns of the piston shown in FIG. 3. FIG. 7 is a vertical cross-sectional view illustrating another example arrangement of a cylinder and a piston in the internal combustion engine shown in FIG. 2. FIG. 8 is a table including material properties of members such as cylinders and pistons in the internal combustion engines of the present embodiments and in traditional internal combustion engines.

To describe the internal combustion engine of the present embodiment, an internal combustion system including the internal combustion engine will now be described with reference to FIG. 1. As shown in FIG. 1, an internal combustion system 10 of the present embodiment includes an internal combustion engine 20, an intake passage 40, an exhaust passage 50, a turbo charger 60, and an exhaust gas recirculation (EGR) unit 70. The internal combustion system 10 as shown in FIG. 1 is usually used in a diesel engine.

Each unit of the internal combustion system 10 as shown in FIG. 1 will now be described in detail. The internal combustion engine 20 is referred to as a multicylinder engine, which has a plurality of cylinders. The internal combustion engine 20 includes an intake port 32 and an exhaust port 34 for each of the cylinders. In the internal combustion engine 20, intake air containing fresh air is fed to the cylinders via the intake ports 32 and mixed with fuel in the cylinders to burn. The combustion causes a crankshaft 21 to rotate. The exhaust gas after the combustion is exhausted to the exterior of the cylinders via the exhaust ports 34.

As shown in FIG. 1, the internal combustion engine 20 is connected with the intake passage 40. The intake passage 40 includes an intake pipe 42 and an intake manifold 44. The intake manifold 44 connects the intake pipe 42 with the intake ports 32 for the cylinders of the internal combustion engine 20. An air cleaner 46 is disposed upstream of the intake pipe 42 in the intake direction.

As shown in FIG. 1, the internal combustion engine 20 is connected with the exhaust passage 50. The exhaust passage 50 includes an exhaust pipe 52 and an exhaust manifold 54. The exhaust manifold 54 connects the exhaust pipe 52 with the exhaust ports 34 for the cylinders of the internal combustion engine 20. An exhaust gas cleaning catalyst 56 is disposed downstream of the exhaust pipe 52 in the exhaust direction for cleaning the exhaust gas from the exhaust pipe 52.

The turbo charger 60 includes a turbo compressor 62 and a turbine 64. The turbo compressor 62 is disposed on the intake pipe 42, downstream of the air cleaner 46 in the intake direction. The turbine 64 is disposed on the exhaust pipe 52, upstream of the exhaust gas cleaning catalyst 56 in the exhaust direction. The turbo charger 60 is configured such that the exhaust gas flowing through the exhaust pipe 52 rotates the turbine 64 and then the turbo compressor 62 supercharges intake air into the intake pipe 42. In the present embodiment, the turbo charger 60 functions as a supercharger for supercharging intake air into a combustion chamber 26 (described below) of the internal combustion engine 20.

The EGR unit 70 includes an EGR passage 72, an EGR compressor 73, an EGR valve 74, an EGR cooler 75, a bypass pipe 76, and a control valve 77.

The EGR passage 72 is a passage for the exhaust gas after combustion (EGR gas), and connects a site upstream of the turbine 64 on the exhaust pipe 52 in the exhaust direction with a site downstream of the turbo compressor 62 on the intake pipe 42 in the intake direction. In the present embodiment, the upstream end of the EGR passage 72 in the flow direction of the EGR gas is connected with a converging site of the exhaust manifold 54.

The EGR compressor 73 is disposed on an upstream part of the EGR passage 72 in the flow direction of the EGR gas. The EGR compressor 73 pressure-feeds the EGR gas in the flow direction of the EGR gas toward the intake pipe 42. As shown in FIG. 1, the EGR compressor 73 is coupled to the crankshaft 21 via a power transmission mechanism 78 such as a gear mechanism, which is disposed between the EGR compressor 73 and the crankshaft 21. The EGR compressor 73 is continuously rotated by the rotational driving force transmitted from the crankshaft 21 via the power transmission mechanism 78.

The EGR cooler 75 is disposed on the EGR passage 72, downstream of the EGR compressor 73 in the flow direction of the EGR gas. The EGR valve 74 is disposed on the EGR passage 72, downstream of the EGR cooler 75 in the flow direction of the EGR gas. The EGR valve 74 is an on-off valve adjustable for controlling the supply of the EGR gas into the intake pipe 42. The EGR valve 74 adjusts the recirculation ratio of the exhaust gas to the intake air (an EGR ratio) by adjusting the degree of its opening. The EGR ratio is calculate by dividing the amount of the exhaust gas flowing into the combustion chamber 26 (described below) of the internal combustion engine 20 by the total amount of the air and the exhaust gas flowing into the combustion chamber 26. In the present embodiment, the EGR ratio is kept at 15% or more, as described below.

The bypass pipe 76 connects a site downstream of the EGR compressor 73 on the EGR passage 72 in the flow direction of the EGR gas (specifically, a site between the EGR compressor 73 and the EGR cooler 75) with a site downstream of the exhaust gas cleaning catalyst 56 on the exhaust pipe 52 in the exhaust direction. The bypass pipe 76 branches at a site downstream of the EGR compressor 73 and upstream of the EGR valve 74 in the flow direction of the EGR gas.

The control valve 77 is disposed on the bypass pipe 76. The control valve 77 is an on-off valve adjustable for controlling the communication between the EGR passage 72 and the exhaust pipe 52 via the bypass pipe 76.

The EGR unit 70 with this structure adds the EGR gas to the fresh air fed into the combustion chamber 26 (described below) of the internal combustion engine 20, to prolong an ignition delay in the combustion chamber 26. In the present embodiment, the exhaust gas recirculation with the EGR unit 70 prolongs an ignition delay of a fuel-air mixture in the combustion chamber 26 of the internal combustion engine 20. The ignition delay enhancer prolonging an ignition delay of the mixture controls the EGR valve 74 to keep the EGR ratio of 15% or more. This ensures the increase in an ignition delay of the mixture. The ignition delay enhancer may keep a compression ratio of 17 or less, which is the ratio of the maximum volume to the minimum volume of the combustion chamber 26 of the internal combustion engine 20, or may advance or delay a fuel injection timing such that a main heat generation takes place after a main fuel injection in the combustion chamber 26, to further prolong an ignition delay of a fuel-air mixture in the combustion chamber 26.

The ignition delay enhancer prolongs an ignition delay of a fuel-air mixture in the combustion chamber 26 of the internal combustion engine 20 to perform a low-temperature combustion at a local and temporal temperature in the range of 1300 K to 1800 K in the combustion chamber 26. The low-temperature combustion reduces exhaust gases, such as $CO_2$ and NOx, compared to a traditional high-temperature combustion at a local and temporal temperature in the range of 1500 K to 2500 K in the combustion chamber 26.

The internal combustion engine 20 of an embodiment of the invention will now be described with reference to FIG. 2. As shown in FIG. 2, the internal combustion engine 20 includes the combustion chamber 26, a fuel injector 31 injecting fuel into the combustion chamber 26, a generally cylindrical cylinder 22, and a piston 24 having a crown and reciprocating in the cylinder 22 vertically in FIG. 2, the crown being exposed to the combustion chamber 26. The combustion chamber 26 includes an intake port 32 and an exhaust port 34 in communication with each other. The intake air from the intake pipe 42 on the intake passage 40 is fed into the combustion chamber 26 via the intake port 32.

The exhaust gas from the combustion chamber 26 is exhausted into the exhaust pipe 52 on the exhaust passage 50 via the exhaust port 34. The intake port 32 and the exhaust port 34 are provided with an intake valve 33 and an exhaust valve 35, respectively. The intake valve 33 controls the communication between the intake port 32 and the combustion chamber 26. The exhaust valve 35 controls the communication between the exhaust port 34 and the combustion chamber 26.

The fuel injector 31 is a solenoid injector having a nozzle toward the combustion chamber 26, for example. The fuel injector 31 injects fuel into the combustion chamber 26 to cause spontaneous ignition of fuel therein. In the present embodiment, the internal combustion engine 20 is operated by the spontaneous ignition and combustion of the fuel injected from the fuel injector 31 in the combustion chamber 26. Specifically, a crank mechanism 36 is coupled to the lower part of the piston 24 via a connecting rod 29. The combustion of fuel in the combustion chamber 26 causes the piston 24 to be reciprocated vertically in FIG. 2. The reciprocating motion of the piston 24 is transmitted to the crank mechanism 36 via the connecting rod 29 and is converted to rotational motion by the crank mechanism 36. The internal combustion engine 20 generates rotational driving force in this manner.

FIG. 3 illustrates an example arrangement of the cylinder 22 and the piston 24 in the internal combustion engine 20 shown in FIG. 2. As shown in FIG. 3, a cylinder liner 23 is disposed on the inner surface of the cylinder 22 such that the inner surface of the cylinder liner 23 faces the side surface of the piston 24. A plurality of piston rings 28 are disposed on the side surface of the piston 24 and each of the piston rings 28 provides a seal between the outer surface of the piston 24 and the inner surface of the cylinder liner 23. The crown of the piston 24 has a cavity 25, to which fuel is injected from the fuel injector 31. The cavity 25 defines part of the combustion chamber 26.

In the present embodiment, a ceramic member 24a is disposed on at least a fuel injection port, to which fuel is injected from the fuel injector 31, of the crown of the piston 24. Specifically, as shown in FIG. 3, the ceramic member 24a is disposed on at least a portion facing the cavity 25, of the crown of the piston 24. The crown of the piston 24 includes the ceramic member 24a combined with an aluminum alloy base 24b. In the piston 24, "the combined ceramic member 24a" is a bulk ceramic member with a thickness of several millimeters, which is disposed on a portion facing the cavity 25, of the aluminum alloy base 24b. In traditional internal combustion engines, metallic piston bodies are coated with ceramic coatings, such as $ZrO_2$, to improve their thermal resistance and wear resistance. Such coatings, however, readily peel under a high compression pressure in the combustion chamber 26 due to their small thicknesses of several microns to several tens of microns. Moreover, as described below, the surface coatings cannot prevent the thermal deformation of the pistons under a high combustion pressure since the aluminum alloy base only has poor thermal resistance. It is preferable to combine the piston with the bulk ceramic member 24a, which is thicker, harder to peel, and more resistant to shearing force than the traditional coatings. The combination method includes mechanical coupling, junction, shrink fitting, press fitting, and enveloped casting. The combination of the ceramic member 24a with the crown of the piston 24 utilizes interface strength caused by thermal stress. To obtain the interface strength, the surface of the ceramic member 24a combined by enveloped casting may be roughened for improving its anchor effect, undergo electroless plating, be coated with active metal, or be covered with intermediate material for inclining thermal expansion. In these combination methods, enveloped casting is preferred. Enveloped casting includes gravity casting, low pressure casting, pressure casting, and die casting.

In the present embodiment, the ceramic member 24a to be disposed on at least a fuel injection port, to which fuel is injected from the fuel injector 31, of the crown of the piston 24 can be formed by various methods for producing ceramics. Those methods include die molding, CIP (rubber pressing), extrusion molding, injection molding, slip casting, and gel casting. These methods may be combined with machining after molding or firing. In these methods, gel casting is preferred. In gel casting, ceramic slurry containing ceramic powder, a dispersion medium, and a gelling agent is poured into a cavity in a mold (the cavity is filled with the slurry for molding and has the same shape as a desired ceramic compact), and cured and dried to produce a ceramic compact. Gel casting, in which the ceramic slurry is poured into the cavity in the mold and cured therein for molding the ceramic member 24a, readily duplicates a complicated shape of a mold, and prevents an irregular density distribution and deformation. Gel casting, which can duplicate a complicated structure, also reduces the manufacturing costs for machining hard ceramics after firing.

In the present embodiment, the ceramic member 24a on a portion facing the cavity 25, of the crown of the piston 24 is composed of silicon nitride ($Si_3N_4$). Besides silicon nitride ($Si_3N_4$), the ceramic member 24a on the piston 24 may be composed of any other carbide ($B_4C$, TiC, NbC, TaC, or ZrC, for example), SiAlON, stabilized zirconia ($ZrO_2$), or a mixture containing at least one of these compounds, as long as these materials have wear resistance and low thermal conductivity. Typical properties of these materials for the ceramic member 24a on the piston 24 will be described below.

In the embodiment shown in FIG. 3, the cylinder 22 and the cylinder liner 23 are composed of cast iron. The piston rings 28 are metallic members, such as steel members, coated with CrN or plated with hard Cr.

In the internal combustion engine 20, as described above, the ignition delay enhancer prolongs an ignition delay of a fuel-air mixture in the combustion chamber 26 in the internal combustion engine 20, which leads to a low-temperature combustion at a local and temporal temperature in the range of 1300 K to 1800 K in the combustion chamber 26. In this case, the fuel, which is injected from the fuel injector 31 into the combustion chamber 26 to adhere to the crown of the piston 24, may be cooled to evaporate as unburned material. In the present embodiment, the ceramic member 24a is disposed on at least a fuel injection port, to which fuel is injected from the fuel injector 31, of the crown of the piston 24. The ceramic member 24a can maintain a high wall temperature of the port, to which fuel is injected from the fuel injector 31, of the crown of the piston 24, due to its lower thermal conductivity than aluminum alloy. This prevents the fuel injected into the combustion chamber 26 from evaporating as unburned material, and reduces the emission of the unburned material. Moreover, the high wall temperature prevents deposits on the surface of the combustion chamber 26 during a long time use. The ceramic member 24a enhances the thermal insulation of the crown of the piston 24 to reduce the thermal loss in the combustion chamber 26. The ceramic member 24a on the crown of the piston 24 increases the EGR rate in the internal combustion engine 20 to improve the efficiency of the internal combustion engine 20 and to reduce exhaust gases, such as $CO_2$ and NOx.

As described below, the piston 24 including the aluminum alloy base 24b combined with the ceramic member 24a, which is lightweight and has high strength and wear resistance, is substantially lightweight compared to a piston of cast iron. The piston 24 is also wear resistant even under a high combustion pressure in the combustion chamber 26. By virtue of these advantages, the ceramic member 24a on the crown of the piston 24 reduces the fuel consumption in the vehicle with the internal combustion engine 20 of the present embodiment.

The piston 24 of aluminum alloy readily deforms at a high temperature due to its low Young's modulus and thermal resistance; hence, a high combustion pressure in the combustion chamber 26 may cause the thermal deformation of the piston 24. The lip, which is at an inner edge of an opening in the top surface of the crown of the piston 24, will have a high temperature and may be broken. The ceramic member 24a on the crown of the piston 24 prevents the thermal deformation of the piston 24 under a high combustion pressure in the combustion chamber 26 due to its higher Young's modulus and thermal resistance than aluminum alloy. The ceramic member 24a also prevents the lip, which is at an inner edge of an opening in the top surface of the crown of the piston 24, from being broken by the local high temperature. The structure of the lip will be described below.

The shape and dimension of the ceramic member 24a on the crown of the piston 24 will now be described in detail with reference to FIGS. 4 to 6. FIGS. 4 to 6 are enlarged vertical cross-sectional view illustrating different example crowns of the piston 24 shown in FIG. 3.

The piston 24 shown in FIG. 4 has a lip 24p at an inner edge of an opening in the top surface (the upper surface in FIG. 4) of the crown. The vertical cross section of the lip 24p has acute angles. In this piston 24, the lip 24p of the piston 24 will have the highest temperature when fuel is injected from the fuel injector 31 into the combustion chamber 26 to burn. In the present embodiment, the lip 24p, which is composed of the ceramic member 24a, has high thermal resistance and does not break. The piston 24 shown in FIG. 5 has a wall 24q orthogonal to the top surface, at an inner edge of an opening in the top surface (the upper surface in FIG. 5) of the crown, in place of the lip the vertical cross section of which has acute angles. The piston 24 shown in FIG. 6 has a lip 24r having a round shape curving toward the top surface, at an inner edge of an opening in the top surface (the upper surface in FIG. 6) of the crown. In this piston 24, the lip 24r of the piston 24 will have the highest temperature when fuel is injected from the fuel injector 31 into the combustion chamber 26 to burn. In the present embodiment, the lip 24r, which is composed of the ceramic member 24a, has high thermal resistance and does not break.

In the present embodiment, an overhang ratio (=d1/d2) is used as a parameter indicating the shape and dimension of the ceramic member 24a on the crown of the piston 24. The overhang ratio is related to the shape and dimension of the boundary between the ceramic member 24a and the aluminum alloy base 24b, where d1 denotes a diameter of the boundary between the ceramic member 24a and the aluminum alloy base 24b on the top surface (the upper surface in FIGS. 4 to 6) of the piston 24, and d2 denotes a maximum diameter of the boundary between the ceramic member 24a and the aluminum alloy base 24b in the radial direction (the lateral direction in FIGS. 4 to 6) of the piston 24. In the present invention, the shapes and dimensions of the ceramic members 24a and the aluminum alloy bases 24b are defined such that the overhang ratio (=d1/d2) ranges from 0.57 to 0.96. The overhang ratio is used as a parameter indicating the extent of retention of the ceramic member 24a on the aluminum alloy base 24b while the piston 24 is being reciprocated in the cylinder 22 at a high speed. In the present embodiment, the outer periphery of the ceramic member 24a has a streamlined overhang shape. This shape prevents stress concentration when the ceramic member 24a is combined with the aluminum alloy base 24b and does not need a complicated coupling structure.

An overhang ratio less than 0.57 increases a reentrant ratio in the combustion chamber 26, resulting in adverse effects on the injection and combustion flow in the combustion chamber 26, or precludes the production of the ceramic member 24a. In addition, an overhang ratio less than 0.57 narrows the acute angles of the lip 24p or 24r at an inner edge of an opening in the top surface of the crown of the piston 24 in the vertical cross sectional view, resulting in an extremely high local temperature of the lip 24p or 24r and its breakage even though the lip 24p or 24r is composed of the ceramic member 24a.

An overhang ratio more than 0.96 may cause the ceramic member 24a to be detached from the aluminum alloy base 24b while the piston 24 is being reciprocated in the cylinder 22 at a high speed. In the present embodiment, the ceramic member 24a is combined with the aluminum alloy base 24b by enveloped casting. In this case, the aluminum alloy base 24b contracts during production to cramp the ceramic member 24a. Furthermore, during a cooling process in enveloped casting for reducing the thermal stress on the ceramic member 24a, annealing for releasing distortion is performed at a higher temperature (approximately 200 to 400° C., for example) than the service temperature of the aluminum alloy base 24b. This allows the aluminum alloy base 24b to contract and fasten the ceramic member 24a during production without breaking the ceramic member 24a. In view of fastening the ceramic member 24a on the aluminum alloy base 24b, the overhang ratio of 0.96 or less is preferable.

Since the vehicle on which the internal combustion engine 20 is to be mounted has its own style, the interior of the combustion chamber 26, especially the cavity 25 in the piston 24, in the internal combustion engine 20 should have a shape that can meet such a style. In the present embodiment, the crown of the piston 24 is formed by forming the ceramic member 24a by gel casting and combining the ceramic member 24a with the aluminum alloy base 24b by enveloped casting. In this case, the aluminum alloy base 24b can have a predetermined shape, and the overhang ratio is invariable regardless of the shape of the aluminum alloy base 24b. The overhang ratio is thereby determined depending on the shape of the aluminum alloy base 24b, not on the shape of the ceramic member 24a. The ceramic member 24a may have any shape to meet requirements of the combustion chamber 26 as shown in FIGS. 4 and 6. To optimize the flow of injected fuel in the combustion chamber 26, the combustion chamber 26 preferably has a recess as shown in FIGS. 4 and 6.

Several methods for forming the ceramic member 24a having the shapes as shown in FIGS. 4 to 6 by gel casting will now be described. One method for forming the ceramic member 24a involves forming two compacts with two molds by gel casting, joining the compacts together, and firing the joined compacts. Another method for forming the ceramic member 24a involves producing a calcined compact, which can be readily machined compared to a fired compact, after gel casting, trimming the calcined compact such that the combustion chamber 26 will have a recess, and firing the recessed calcined compact. Yet another method for forming the ceramic member 24a involves producing a calcined compact, which can be readily machined compared to a fired compact, after CIP (rubber press) molding, for example, trimming the calcined compact such that the combustion chamber 26 will have a recess, and firing the recessed calcined compact.

To prevent detachment of the ceramic member 24a having the shapes shown in FIGS. 4 to 6 from the aluminum alloy base 24b, the surface of the ceramic member 24a is preferably roughened. Specifically, the ceramic member 24a preferably has a surface roughness Ra of 0.2 to 0.3 or more, for example. The roughened surface of the ceramic member 24a enhances the coupling force between the ceramic member 24a and the aluminum alloy base 24b due to the anchor effect of the surface of the ceramic member 24a. The roughened surface of the ceramic member 24a allows the insulation by the air microgaps between the ceramic member 24a and the aluminum alloy base 24b. The ceramic member 24a made of silicon nitride by gel casting is spontaneously roughened. This ceramic member 24a has a surface roughness Ra of 0.2 to 0.3 or more without machining on the surface of the fired compact. This can eliminate machining on the surface of the fired compact and significantly reduces the manufacturing costs of the ceramic member 24a. After firing, the ceramic member 24a may be blasted to be roughened.

In the embodiment shown in FIG. 7, the ceramic member 24a may be disposed over the entire area of the crown of the piston 24. In the embodiment shown in FIG. 7, the crown of the piston 24 includes the ceramic member 24a combined with the aluminum alloy base 24b by enveloped casting as in the embodiment shown in FIG. 3. In the embodiment shown in FIG. 7, the cylinder 22 is composed of aluminum alloy, and a ceramic member 23a is disposed on at least a part facing the crown of the piston 24, of the cylinder liner 23. Specifically, the cylinder liner 23 shown in FIG. 7 includes the ceramic member 23a combined with the inner surface of the cylinder 22 of aluminum alloy by enveloped casting. In the present embodiment, the ceramic member 23a on the cylinder liner 23 may be formed by gel casting.

The ceramic member 23a on the cylinder liner 23 and the ceramic member 24a on the crown of the piston 24 may be composed of the same material or different materials. For example, the ceramic member 23a on the cylinder liner 23 may be composed of silicon nitride ($Si_3N_4$). In a combination of the ceramic member 23a on the cylinder liner 23 and the ceramic member 24a on the crown of the piston 24 composed of different materials, these materials should preferably not have a substantial difference in the coefficient of thermal expansion.

The ceramic member 23a on the cylinder liner 23 has an advantage of a small coefficient of thermal expansion, in addition to the advantages of the ceramic member 24a on the crown of the piston 24. The ceramic member 23a with the small coefficient of thermal expansion prevents a change in gap or clearance between the piston 24 and the cylinder liner 23 by a temperature fluctuation in the combustion chamber 26 and prevents the decrease in the thermal efficiency of the internal combustion engine 20.

In a combination of the ceramic member 23a on the cylinder liner 23 and the ceramic member 24a on the crown of the piston 24 composed of different materials, the ceramic member 23a on the cylinder liner 23 may be composed of a porous silicon nitride ($Si_3N_4$) having interconnected pores. Besides silicon nitride ($Si_3N_4$), the ceramic member 23a on the cylinder liner 23 may be composed of any other carbide (B$_4$C, TiC, NbC, TaC, or ZrC, for example), alumina, mullite, SiAlON, stabilized zirconia (ZrO$_2$), silica (SiO$_2$), or a mixture containing at least one of these compounds (an alumina-silica mixture, for example), as long as these materials have high wear resistance and low thermal conductivity. A porous ceramic member may be made of a particulate material or a fibrous material (filament or short fiber). If the ceramic member 23a on the cylinder liner 23 is a porous ceramic member having interconnected pores, the ceramic member 23a is combined with the inner surface of the aluminum alloy cylinder 22 by enveloped casting to form the cylinder liner 23, and the interconnected pores of the ceramic member 23a are thereby filled with aluminum alloy. The cylinder liner 23 then becomes a composite material of silicon nitride (Si$_3$N$_4$) and aluminum alloy. The enveloped casting is preferably carried out under pressure such that the interconnected pores in the porous ceramic member are impregnated with molten aluminum alloy. In this case, the porous ceramic member can maintain the high wear resistance of the cylinder liner 23 and reduces the wear of the piston rings 28 during the reciprocation of the piston 24. After a long use of the internal combustion engine 20, the aluminum alloy portions of the composite member of the cylinder liner 23 will wear; however, the worn portions can retain oil that improves the lubrication of the cylinder liner 23.

Typical properties of aluminum alloy and cast iron used for pistons and cylinders in traditional internal combustion engines, and typical properties of materials used for the ceramic members 24a on the crowns of the pistons 24 and the ceramic members 23a on the cylinder liners 23 in the internal combustion engines 20 of the present embodiments will now be described with reference to the table in FIG. 8. The methods for measuring the items listed in the table in FIG. 8 are as follows: The "density" is measured by an Archimedean method using pure water as a medium. The "bending strength of ceramics" is measured by a four point bending test in accordance with JISR1601. The "Young's modulus" is measured based on a liner part, indicating the area of elastic deformation, of a stress-strain curve. The "thermal conductivity" is measured by a laser flash method at ambient temperature in accordance with JISR1611. The "coefficient of thermal expansion" is measured at a heating rate of 10 K per minute under an argon gas atmosphere in accordance with JISR1618. The "hardness" is measured by Vickers hardness testing at ambient temperature in accordance with JISR1610.

As shown in the table in FIG. 8, the ceramic materials have thermal conductivities much lower than that of aluminum alloy. The results demonstrate that the ceramic member 24a disposed on at least a fuel injection port, to which fuel is injected from the fuel injector 31, of the crown of the piston 24 can maintain a high wall temperature of the port in a low-temperature combustion at a local and temporal temperature in the range of 1300 K to 1800 K in the combustion chamber 26. This prevents the fuel, which is injected into the combustion chamber 26 to adhere to the crown of the piston 24, from evaporating as unburned material, and reduces the emission of the unburned material. Moreover, the high wall temperature prevents deposits on the surface of the combustion chamber 26 during a long time use. The ceramic member 24a also enhances the insulation of the crown of the piston 24 and reduces the thermal loss in the combustion chamber 26.

As shown in the table in FIG. 8, these ceramic materials each have a hardness of 1000 Hv or more, which is much higher than that of aluminum alloy or cast iron. As a result, the ceramic member 24a on the crown of the piston 24 and the ceramic member 23a on the cylinder liner 23 prevent the abrasion loss during a long time use of the internal combustion engine 20 compared to aluminum alloy and cast iron. These ceramic members have Young's moduli of 180 GPa or more, which are higher than those of aluminum alloy and cast iron, and are levels that can effectively prevent the thermal deformation under a high combustion pressure.

To reduce exhaust gases, such as CO$_2$ and NOx, in traditional heavy duty diesel vehicles, the piston 24 in the internal combustion engine 20 is composed of cast iron. As shown in the table in FIG. 8, the aluminum alloy and ceramic materials have densities lower than that of cast iron; hence, the piston 24 of a composite material of aluminum alloy and a ceramic material is significantly lightweight compared to a piston of cast iron.

Examples of the internal combustion engines 20 of the present embodiments will now be described with reference to Tables 1 and 2 below.

Example 1a

The ceramic member 24a to be disposed on the piston 24 for a diesel engine shown in FIGS. 3 and 4 was formed by gel casting. Specifically, slurry for molding was prepared and cast into a mold, and gelated or cured, to produce a compact. The compact was fired and sintered to yield the ceramic member 24a. The slurry for molding was prepared by adding a dispersant to a dispersion medium and mixing them at ambient temperature (around 20° C.), adding ceramic powder to the mixture and dispersing the mixture to yield slurry, adding a gelling agent to the slurry and dispersing the mixture, and adding a reaction medium to the slurry. In the present embodiment, the powder was silicon nitride (Si$_3$N$_4$) having an average particle diameter of 0.5 μm, the sintering agent was a mixture of yttrium oxide (Y$_2$O$_3$) and alumina (Al$_2$O$_3$), the dispersion medium was a 10:90 mixture in a mass ratio of triacetin and dimethyl glutarate, the dispersant was polymaleic acid copolymer A, the gelling agent was modified hexamethylene diisocyanate (HDI), and the reaction agent was triethylamine.

The prepared slurry for molding was cast into a mold, and gelated or cured for a certain period of time, to produce a compact. In detail, the slurry was cured at ambient temperature for six hours. The slurry was cast into a mold having a cavity that gives an overhang ratio (=d1/d2) of 0.85, to produce a compact. The compact was dried and calcined, and subjected to machining on the inner surface of the cavity 25. The compact was then fired under a N$_2$ atmosphere at 1800° C. for three hours, to yield a sintered ceramic member 24a. The process conditions were adjusted such that the inner diameter of the cavity 25 in the sintered silicon nitride member was 51.6 mm, the thickness of the silicon nitride member was approximately 4 mm after the silicon nitride member was fired. The surface of the fired silicon nitride member was readily roughened to have a surface roughness Ra of 1.5. The outer surface of the member was thereby subjected to electroless plating of Ni, without machining on the surface, to form a Ni layer with a thickness of 2 to 3 microns on the outer surface to be subjected to enveloped casting.

The fired silicon nitride member was set in a mold for aluminum alloy casting, and the mold was then preheated at 600° C. for one hour before casting. Aluminum alloy was molten at 800° C. and cast into the mold under an argon gas atmosphere. After fifteen minutes, the mold containing aluminum alloy and the fired silicon nitride member was cooled in a furnace to yield the piston 24 including the silicon nitride member combined with the aluminum alloy base. In the cooling process, annealing for releasing distortion was performed at 350° C. for one hour to reduce the thermal stress between the silicon nitride member and the aluminum alloy base. The aluminum alloy used for the piston 24 was a casting AC8A alloy (JIS) with high thermal resistance. After the above processes, the piston 24 was treated by a T6 process (JIS), which is a thermal process for the aluminum alloy base. The outer surface of the piston 24 was finally machined such that the aluminum alloy base had an outer diameter of 84 mm, which is an outer diameter of the piston 24.

The silicon nitride material used in the present embodiment had the properties shown in FIG. 8, and had a thermal conductivity of 26 W/mK.

The cylinder liner 23 was formed in the following processes. Cast iron was processed to form a member to be disposed on the inner surface of the cylinder liner 23. The cast iron member was then set in a mold for aluminum alloy casting, and the mold was preheated at 200° C. before casting. Aluminum alloy was molten at 800° C. and cast into the mold. The mold containing aluminum alloy and the cast iron member was cooled in a furnace to yield a cylinder 22 including the cast iron member combined with the aluminum alloy base. The aluminum alloy used was a casting AC4B alloy (JIS).

Example 1b

The piston 24 and the cylinder 22 were prepared as in Example 1a, except that the overhang ratio was 0.70 in this example.

Example 1c

The piston 24 and the cylinder 22 were prepared as in Example 1a, except that the silicon nitride material had a thermal conductivity of 10 W/mK in this example.

Example 1d

The piston 24 and the cylinder 22 were prepared as in Example 1a, except that the overhang ratio was 0.60 in this example.

Example 1e

The piston 24 and the cylinder 22 were prepared as in Example 1a, except that the silicon nitride material had a thermal conductivity of 10 W/mK and the overhang ratio was 0.60 in this example.

Examples 2 and 3

In Example 2, the piston 24 having a member composed of SiAlON on a fuel injection port of the crown was prepared as in Example 1a. In Example 3, the piston 24 having a member composed of yttria-stabilized zirconia (ZrO$_2$) on a fuel injection port of the crown was prepared as in Example 1a. In Example 2, the surface of the SiAlON member was readily roughened to have a surface roughness Ra of 0.9, which eliminated machining before enveloped casting. The SiAlON used in the present example had the properties shown in FIG. 8, and had a thermal conductivity of 15 W/mK. In Example 3, the yttria-stabilized zirconia (ZrO$_2$) had a thermal conductivity of 3 W/mK. The surface of the yttria-stabilized zirconia member was roughened by blasting to have a surface roughness Ra of 0.5.

Example 4a

The ceramic member 24a to be disposed on the piston 24 for a diesel engine shown in FIG. 7 was formed by gel casting. Specifically, slurry for molding was prepared and cast into a mold, and gelated or cured, to produce a compact. The compact was fired and sintered to yield the ceramic member 24a. The slurry for molding was prepared by adding a dispersant to a dispersion medium and mixing them at ambient temperature (around 20° C.), adding ceramic powder to the mixture and dispersing the mixture to yield slurry, adding a gelling agent to the slurry and dispersing the mixture, and adding a reaction medium to the slurry. In the present embodiment, the powder was silicon nitride (Si$_3$N$_4$) having an average particle diameter of 0.5 μm, the sintering agent was a mixture of yttrium oxide (Y$_2$O$_3$) and alumina (Al$_2$O$_3$), the dispersion medium was a 10:90 mixture in a mass ratio of triacetin and dimethyl glutarate, the dispersant was polymaleic acid copolymer A, the gelling agent was modified hexamethylene diisocyanate (HDI), and the reaction agent was triethylamine.

The prepared slurry for molding was cast into a mold, and gelated or cured for a certain period of time, to produce a compact. In detail, the slurry was cured at ambient temperature for six hours. The compact was dried and calcined, and subjected to machining on the inner surface of the cavity 25. The compact was then fired under a N$_2$ atmosphere at 1800° C. for three hours, to yield a sintered ceramic member 24a. The process conditions were adjusted such that the inner diameter of the cavity 25 in the sintered silicon nitride member was 51.6 mm, and the outer diameter of the sintered silicon nitride member was 84 mm. The lower outer surface of the member was subjected to electroless plating of Ni to form a Ni layer with a thickness of 2 to 3 microns on the lower outer surface to be subjected to enveloped casting.

The fired silicon nitride member was set in a mold for aluminum alloy casting, and the mold was then preheated at 600° C. for one hour before casting. Aluminum alloy was molten at 800° C. and cast into the mold under an argon gas atmosphere. After fifteen minutes, the mold containing aluminum alloy and the fired silicon nitride member was cooled in a furnace to yield the piston 24 including the silicon nitride member combined with the aluminum alloy base. In the cooling process, annealing for releasing distortion was performed at 350° C. for one hour to reduce the thermal stress between the silicon nitride member and the aluminum alloy base. The aluminum alloy used for the piston 24 was a casting AC8A alloy (JIS) with high thermal resistance. After the above processes, the piston 24 was treated by a T6 process (JIS), which is a thermal process for the aluminum alloy base. The outer surface of the piston 24 was finally machined such that the aluminum alloy base had an outer diameter of 84 mm, which is an outer diameter of the piston 24.

The cylinder liner 23 was formed as in the above processes. The fired silicon nitride member formed by gel casting was combined with the aluminum alloy base by enveloped casting to yield the cylinder liner 23. The cylinder 22 has the cylinder liner 23 including the silicon nitride member combined with the aluminum alloy base. The aluminum alloy used was a casting AC4B alloy (JIS).

Example 4b

The piston 24 having a fuel injection port and a crown which were composed of SiAlON, and the cylinder 22 having an inner surface (the cylinder liner 23) composed of SiAlON were prepared as in Example 4a.

Example 5

The piston 24 having a fuel injection port and a crown which were composed of yttria-stabilized zirconia ($ZrO_2$), and the cylinder 22 having an inner surface (the cylinder liner 23) composed of yttria-stabilized zirconia ($ZrO_2$) were prepared as in Example 4a.

Example 6a

The piston 24 including the silicon nitride member combined with the aluminum alloy base was prepared as in Example 4a.

The cylinder liner 23 was formed in the following processes. Alumina-silica fiber was processed to form a ceramic porous member for impregnation as a preform. The preform was then set in a mold for aluminum alloy casting, and the mold was preheated at 200° C. before casting. Aluminum alloy was molten at 800° C. and cast into the mold. The mold containing aluminum alloy and the preform was cooled in a furnace under a pressure of approximately 80 MPa such that the interconnected pores of the preform were impregnated with the molten aluminum alloy, to yield a composite cylinder liner of an alumina-silica fiber/aluminum alloy. The cylinder 22 was composed of this composite cylinder liner and the aluminum base. The aluminum alloy used was a casting AC4B alloy (JIS).

Example 6b

The piston 24 having a fuel injection port and a crown which were composed of SiAlON was prepared as in Example 6a.

Example 7a

The cylinder 22 having the inner surface (the cylinder liner 23) composed of a mullite/aluminum alloy composite instead of silicon nitride or an alumina-silica fiber/aluminum alloy composite, and combined with the aluminum alloy base was prepared as in Example 6a.

Example 7b

The piston 24 having a fuel injection port and a crown which were composed of SiAlON was prepared as in Example 7a.

Example 8

The piston 24 having a fuel injection port and a crown which were composed of yttria-stabilized zirconia ($ZrO_2$) was prepared as in Example 6a.

Example 9

The piston 24 having a fuel injection port and a crown which were composed of yttria-stabilized zirconia ($ZrO_2$) was prepared as in Example 7a.

(Comparison 1)

The piston 24 and the cylinder liner 23, both of which were composed of cast iron, were prepared. In Comparison 1, the overhang ratio was calculated by replacing the conditions regarding the ceramic member with those regarding the iron member. (As described above, the ceramic member had a thicknesses of approximately 4 mm.)

(Comparisons 2 and 3)

The pistons 24 formed by die molding of aluminum alloy, and the cylinder liners 23 including the aluminum alloy members combined with the cast iron bases by enveloped casting were prepared. In Comparisons 2 and 3, the overhang ratios were calculated by replacing the conditions regarding the ceramic members with those regarding the aluminum alloy members. (As described above, the ceramic members had thicknesses of approximately 4 mm.)

(Comparison 4)

The piston 24 and the cylinder 22 were prepared as in Example 1a, except that the overhang ratio was 0.99 and the outer surface of the fired silicon nitride member was machined to have a surface roughness Ra of 0.1 in this comparison.

<Evaluation>

Samples were evaluated on the improvement in the efficiency in fuel consumption and the emission of unburned material through engine tests with the pistons 24 and the cylinders 22 for diesel engines prepared in Examples 1 to 9 and Comparisons 1 to 4. The engines were tested at an EGR rate of 50% and at an engine speed in the range of 1500 to 4500 rpm. The improvement in the efficiency in fuel consumption was calculated with a brake mean effective pressure (BMEP). The emission of unburned material was evaluated from the amounts of HC, CO, and NOx in exhaust gas.

In Table 1, the degree of the improvement in the efficiency in fuel consumption is indicated with four marks. The double circle indicates the highest improvement, the single circle indicates the second highest improvement, the triangle indicates the second lowest improvement, and the X indicates the lowest improvement. To evaluate the improvement in the efficiency in fuel consumption, comparisons were made with a piston of aluminum alloy (Comparison 2). In Table 2, the circle indicates no emission of unburned material. In the case where some emission is observed, the degree of the emission is indicated by triangle and X. Triangle indicates a smaller emission than X.

TABLE 1

| | Piston | | | Cylinder | | |
| --- | --- | --- | --- | --- | --- | --- |
| | Fuel Injection Port | Crown | Lower Part | Inner Surface (Liner) | Outer Part | Evaluation |
| Examples 1a to 1e | Silicon Nitride | | Aluminum Alloy | Cast Iron | Aluminum Alloy | ○ |
| Example 2 | SiAlON | | Aluminum Alloy | Cast Iron | Aluminum Alloy | ○ |
| Example 3 | Yttria-Stabilized Zirconia | | Aluminum Alloy | Cast Iron | Aluminum Alloy | ○ |

TABLE 1-continued

| | Piston | | | Cylinder | | |
|---|---|---|---|---|---|---|
| | Fuel Injection Port | Crown | Lower Part | Inner Surface (Liner) | Outer Part | Evaluation |
| Example 4a | Silicon Nitride | Silicon Nitride | Aluminum Alloy | Silicon Nitride | Aluminum Alloy | ◎ |
| Example 4b | SiAlON | SiAlON | Aluminum Alloy | SiAlON | Aluminum Alloy | ◎ |
| Example 5 | Yttria-Stabilized Zirconia | Yttria-Stabilized Zirconia | Aluminum Alloy | Yttria-Stabilized Zirconia | Aluminum Alloy | ◎ |
| Example 6a | Silicon Nitride | Silicon Nitride | Aluminum Alloy | Alumina-Silica Fiber/Aluminum Alloy Composite | Aluminum Alloy | from ○ to ◎ |
| Example 6b | SiAlON | SiAlON | Aluminum Alloy | Alumina-Silica Fiber/Aluminum Alloy Composite | Aluminum Alloy | from ○ to ◎ |
| Example 7a | Silicon Nitride | Silicon Nitride | Aluminum Alloy | Mullite/Aluminum Alloy Composite | Aluminum Alloy | from ○ to ◎ |
| Example 7b | SiAlON | SiAlON | Aluminum Alloy | Mullite/Aluminum Alloy Composite | Aluminum Alloy | from ○ to ◎ |
| Example 8 | Yttria-Stabilized Zirconia | Yttria-Stabilized Zirconia | Aluminum Alloy | Alumina-Silica Fiber/Aluminum Alloy Composite | Aluminum Alloy | from ○ to ◎ |
| Example 9 | Yttria-Stabilized Zirconia | Yttria-Stabilized Zirconia | Aluminum Alloy | Mullite/Aluminum Alloy Composite | Aluminum Alloy | from ○ to ◎ |
| Comparison 1 | Cast iron | | | Cast Iron | Cast Iron | Δ |
| Comparison 2 | Aluminum Alloy | | | Cast Iron | Aluminum Alloy | X |
| Comparison 3 | Aluminum Alloy | | | Cast Iron | Aluminum Alloy | X |
| Comparison 4 | Silicon Nitride | Aluminum Alloy | | Cast Iron | Aluminum Alloy | — |

TABLE 2

| | Piston | | | Evaluation Results | |
|---|---|---|---|---|---|
| | Fuel Injection Port | Thermal Conductivity [w/mK] | Overhang Ratio d1/d2 | Fuel Consumption Efficiency | Unburned Material |
| Example 1a | Silicon Nitride | 26 | 0.85 | approx. 1.5% UP | ○ |
| Example 1b | Silicon Nitride | 26 | 0.70 | — | ○ |
| Example 1c | Silicon Nitride | 10 | 0.85 | approx. 3.0% UP | ○ |
| Example 1d | Silicon Nitride | 26 | 0.60 | — | ○ |
| Example 1e | Silicon Nitride | 10 | 0.60 | — | ○ |
| Example 2 | SiAlON | 15 | 0.85 | approx. 2.1% UP | ○ |
| Example 3 | Yttria-Stabilized Zirconia | 3 | 0.85 | approx. 3.3% UP | ○ |
| Comparison 1 | Cast Iron | | 0.85 | — | Δ |
| Comparison 2 | Aluminum Alloy | | 0.85 | — | X |
| Comparison 3 | Aluminum Alloy | | 0.60 | — | X |
| Comparison 4 | Silicon Nitride | 26 | 0.99 | — | — |

The results of the engine tests in Comparisons 1 to 3 demonstrate the emissions of unburned material, while the results of the engine tests using the ceramic members of the present embodiments, which have insulation effects, show less emission of unburned material. Especially, the reduction in the emission of HC was outstanding. In comparison of the piston 24 of Example 1e with that of Comparison 3, the temperature of the lip at an inner edge of an opening in the top surface of the crown in the piston 24 of Comparison 3 reached approximately 370° C., which is higher than the normal temperature of aluminum alloy, and had a thermal resistance problem. In the piston 24 of Example 1e, the temperature of a part of the lip reached approximately 680° C., however, did not have any thermal resistance problem.

The results of the engine test of the internal combustion engine 20 of Example 1a demonstrate an approximately 1.5% improvement in the efficiency in fuel consumption compared to the piston 24 of aluminum alloy of Comparison 2. The results of the engine test of the internal combustion engine 20 of Example 1c demonstrate an approximately 3% improvement in the efficiency in fuel consumption compared to the piston 24 of aluminum alloy of Comparison 2.

In Comparison 4, a trouble occurred in the engine test. The trouble was noise generation due to a little peeling of the ceramic member 24a off the inner surface of the combustion chamber 26. On the occurrence of the noise, the test was stopped.

In the internal combustion engine 20 of the present embodiment, if the ignition delay enhancer prolonging an ignition delay of a fuel-air mixture in the combustion chamber 26 is provided, the ceramic member 24a on the crown of the piston 24 maintains a high wall temperature of a fuel injection port, to which fuel is injected from the fuel injector 31, of the crown of the piston 24 in a low-temperature combustion at a local and temporal temperature in the range of 1300 K to 1800 K in the combustion chamber 26. This prevents the fuel, which is injected into the combustion chamber 26 to adhere to the crown of the piston 24, from evaporating as unburned material, and reduces the emission of the unburned material. The ceramic member 24a also enhances the insulation of the crown of the piston 24 and reduces the thermal loss in the combustion chamber 26. The aluminum piston 24 with the ceramic member 24a in the internal combustion engine 20 is lightweight compared to a piston of cast iron or steel. The ceramic member 24a on the crown of the piston 24 prevents the thermal deformation of the aluminum alloy base under a high combustion pressure in the combustion chamber 26 due to its high Young's modulus, and prevents erosion of the crown of the piston 24 due to fuel injection or deposits on the crown of the piston 24 during a long time use. With these advantages, the internal combustion engine 20 of the present embodiment reduces fuel consumption in a vehicle and exhaust gases, such as $CO_2$ and NOx.

In the internal combustion engine 20 of the present embodiment, the ceramic member 24a is combined with any other member constituting the crown of the pistons 24, specifically the aluminum alloy base 24b as described above. Specifically, the ceramic member 24a is combined with any other member constituting the crown of the piston 24 by mechanical coupling, junction, shrink fitting, press fitting, or enveloped casting. This provides a bulk ceramic member 24a, which is thicker, harder to peel, and more resistant to shearing force than a coating layer. The ceramic member 24a is formed by die molding, CIP, extrusion molding, injection molding, slip casting, or gel casting. Gel casting, in which ceramic slurry is poured into a cavity in a mold and cured therein, readily duplicates a complicated shape of a mold, and prevents an irregular density distribution and deformation of the ceramic member 24a. Gel casting, which can duplicate a complicated structure, also reduces the manufacturing costs for machining hard ceramics after firing.

In the internal combustion engine 20 of the present embodiment, the ceramic member 24a may be disposed on at least a portion facing the cavity 25, of the crown of the piston 24, as shown in FIG. 3, or the ceramic member 24a may be disposed over the entire area of the crown of the piston 24 as shown in FIG. 7.

In the internal engine 20 of the present embodiment, the cylinder liner 23 is disposed on the inner surface of the cylinder 22, the cylinder liner 23 facing the outer surface of the piston 24, and the ceramic member 23a is disposed on at least a part facing the crown of the piston 24, of the cylinder liner 23. In this case, the ceramic member 23a prevents a change in gap or clearance between the piston 24 and the cylinder liner 23 by a temperature fluctuation in the combustion chamber 26, reduces the abrasion loss, and prevents the decrease in the thermal efficiency in the internal combustion engine 20.

As described above, the ceramic member 23a on the cylinder liner 23 and the ceramic member 24a on the crown of the piston 24 may be composed of the same material or different materials. In the latter case, the ceramic member 23a on the cylinder liner 23 may be composed of a porous material. In this case, when combining the ceramic member 23a with the inner surface of the cylinder 22 by enveloped casting to form the cylinder liner 23, the interconnected pores in the ceramic member 23a are filled with aluminum alloy, for example, which constitutes the cylinder 22, and the cylinder liner 23 becomes a composite material of ceramic and aluminum alloy.

The present embodiments of the internal combustion engine 20 can be modified in various ways without limitation.

For example, in the above embodiments, the ceramic member 24a on the crown of the piston 24 and the ceramic member 23a on the cylinder liner 23 are composed of silicon nitride ($Si_3N_4$), any other carbide ($B_4C$, TiC, NbC, TaC, and ZrC, for example), SiAlON, alumina, mullite, stabilized zirconia ($ZrO_2$), silica ($SiO_2$), or a mixture containing at least one of these compounds. The ceramic members 24a and 23a may be any other ceramic material as long as it has a thermal conductivity of 30 W/mK or less. Also in this case, the ceramic material has an enough low thermal conductivity and maintains a high wall temperature of a fuel injection port, to which fuel is injected from the fuel injector 31, of the crown of the piston 24 in a low-temperature combustion at a local and temporal temperature in the range of 1300 K to 1800 K in the combustion chamber 26. This prevents the fuel, which is injected into the combustion chamber 26 to adhere to the crown of the piston 24, from evaporating as unburned material, and reduces the emission of the unburned material. The ceramic member 24a improves the thermal resistance of the crown of the piston 24, and reduces the thermal loss in the combustion chamber 26. The ceramic members 24a and 23a are preferably composed of a ceramic material with a thermal conductivity of 20 W/mK or less.

The internal combustion engines 20 of the present embodiments can be applied not only to diesel engines but also to various engines, such as gasoline engines and homogeneous-charge compression ignition (HCCI) engines.

What is claimed is:

1. An internal combustion engine, comprising:
a combustion chamber;
a fuel injector injecting fuel into the combustion chamber;
a cylinder;
a piston having a crown and reciprocating in the cylinder, the crown being exposed to the combustion chamber; and
an ignition delay enhancer prolonging an ignition delay of a fuel-air mixture in the combustion chamber,
wherein the crown of the piston includes a ceramic member and an aluminum alloy base, the ceramic member is disposed on a position to which at least fuel is injected from the fuel injector, and the aluminum alloy base is disposed on a position to which fuel is not injected from the fuel injector,
the crown of the piston has a cavity defining part of the combustion chamber, the fuel injector injecting fuel to the cavity,
the ceramic member is disposed on at least a portion of the crown of the piston, the portion facing the cavity, and
an overhang ratio that defines a boundary between the ceramic member and the aluminum alloy base ranges from 0.57 to 0.96, the overhang ratio being represented by the ratio d1/d2 where d1 is a diameter of the boundary between the ceramic member and the aluminum alloy base on a top surface of the crown of the piston and d2 is a maximum diameter of the boundary between the ceramic member and the aluminum alloy base in a radial direction of the piston.

2. The internal combustion engine according to claim 1, wherein the ceramic member is combined with the aluminum alloy base constituting the piston.

3. The internal combustion engine according to claim 2, wherein the ceramic member is combined with the aluminum alloy base constituting the piston by mechanical coupling, junction, shrink fitting, press fitting, or enveloped casting.

4. The internal combustion engine according to claim 3, wherein the ceramic member is formed by die molding, cold isostatic pressing, extrusion molding, injection molding, slip casting, or gel casting.

5. The internal combustion engine according to claim 1, wherein the ceramic member on the crown of the piston comprises a material having a thermal conductivity of 30 W/mK or less.

6. The internal combustion engine according to claim 5, wherein the ceramic member on the crown of the piston comprises a material having a thermal conductivity of 20 W/mK or less.

7. The internal combustion engine according to claim 1, wherein the ceramic member on the crown of the piston comprises silicon nitride, SiAlON, stabilized zirconia, or a mixture containing at least one of these materials.

8. The internal combustion engine according to claim 1, wherein the ignition delay enhancer performs exhaust gas recirculation (EGR) for recirculating part of exhaust gas after combustion in the combustion chamber into intake air to prolong an ignition delay of a fuel-air mixture in the combustion chamber.

9. The internal combustion engine according to claim 8, wherein the ignition delay enhancer keeps an EGR rate of 15% or more in recirculation of exhaust gas.

10. The internal combustion engine according to claim 1, wherein the ignition delay enhancer keeps a compression ratio of 17 or less by controlling reciprocation of the piston to prolong an ignition delay of a fuel-air mixture in the combustion chamber, the compression ratio being the ratio of the maximum volume to the minimum volume of the combustion chamber.

11. The internal combustion engine according to claim 1, wherein the ignition delay enhancer advances or delays a fuel injection timing such that a main heat generation takes place after a main fuel injection in the combustion chamber to prolong an ignition delay of a fuel-air mixture in the combustion chamber.

12. The internal combustion engine according to claim 1, comprising a supercharger supercharging intake air into the combustion chamber.

13. An internal combustion engine, comprising:
a combustion chamber;
a cylinder;
a piston having a crown and reciprocating in the cylinder, the crown being exposed to the combustion chamber; and
an ignition delay enhancer prolonging an ignition delay of a fuel-air mixture in the combustion chamber,
wherein a ceramic member is disposed on the crown of the piston and a ceramic member is disposed on at least a part of a cylinder liner,
the ceramic member on the cylinder liner and the ceramic member on the crown of the piston comprise different materials, and
the ceramic member on the cylinder liner comprises a porous material having interconnected pores.

14. The internal combustion engine according to claim 13, wherein the cylinder liner is disposed on an inner surface of the cylinder, the cylinder liner facing an outer surface of the piston, and
the ceramic member on the cylinder liner facing the crown of the piston.

15. The internal combustion engine according to claim 14, wherein the ceramic member on the cylinder liner comprises silicon nitride, alumina, mullite, SiAlON, stabilized zirconia, silica, or a mixture containing at least one of these materials.

* * * * *